No. 825,915. PATENTED JULY 17, 1906.
E. Z. LESH & H. A. WOOLMAN.
TAILOR'S MEASURE.
APPLICATION FILED JUNE 29, 1905.
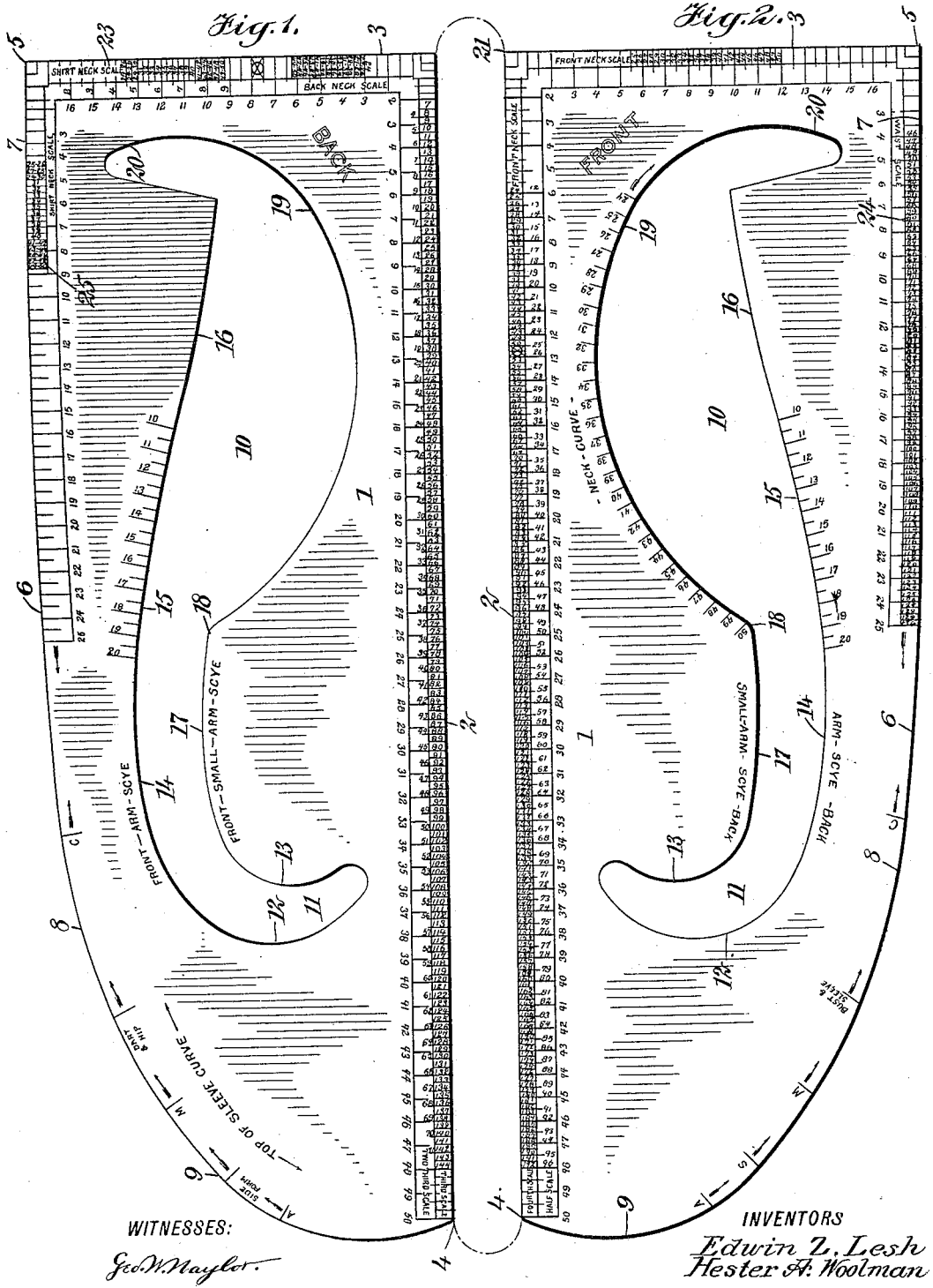
WITNESSES:
INVENTORS
Edwin Z. Lesh
Hester A. Woolman
BY
ATTORNEYS

UNITED STATES PATENT OFFICE.

EDWIN ZACHARIAH LESH AND HESTER A. WOOLMAN, OF GUADALAJARA, MEXICO.

TAILOR'S MEASURE.

No. 825,915.　　　　Specification of Letters Patent.　　　Patented July 17, 1906.

Application filed June 29, 1905. Serial No. 267,522.

*To all whom it may concern:*

Be it known that we, EDWIN ZACHARIAH LESH and HESTER A. WOOLMAN, citizens of the United States, and residents of Guadalajara, Jalisco, Mexico, have invented a new and Improved Tailor's Measure, of which the following is a full, clear, and exact description.

This invention relates to tailors' measures such as used in marking garments before cutting.

The object of the invention is to produce a tailor's measure having scales and marking-curves conveniently placed for the purpose of facilitating the measuring and marking operations.

The invention consists in the construction and arrangement of parts to be described more fully hereinafter and definitely set forth in the claims.

In practice the device is preferably in the form of a plate the edges of which are formed with scales and curved in certain parts, as will be described hereinafter.

Reference is to be had to the accompanying drawings, forming a part of this specification, in which similar characters of reference indicate corresponding parts in both figures.

Figure 1 shows the rear face of the plate, and Fig. 2 shows the front face.

Referring more particularly to the parts, 1 represents the body of the plate, which may be of any suitable material, such as cardboard, celluloid, papier-mâché, or similar material. This plate is formed with a long straight edge 2 and a short straight edge 3 at right angles thereto. The remote points 4 and 5 of these edges 2 and 3 are connected by an edge 6. The part of this edge 6 near the point 5 is substantially straight, as indicated at 7. This straight portion at the division 12 on the adjacent scale gives place to a parabolic curve 8, and this parabolic curve at the point M gives place to an elliptical curve 9, terminating at the point 4. In the body of the plate an opening 10 is formed, said opening having a narrow curved neck 11 extending therefrom in such a manner as to form arcuate curves 12 and 13. The curve 12 is extended into a curved edge 14, having a small degree of curvature, and this edge 14 becomes a compound curve near the point 15, beyond which the curvature is in the opposite direction, as indicated at 16. The curve 13 is somewhat similar to the curve 12, but of smaller proportions, and this edge 13 constitutes an extension of the curved edge 17, which is somewhat of the nature of the curve 14 just described. The curved edge 17 terminates abruptly at the point 18, and at this point also terminates a spiral of Archimedes 19.

The scales which are placed on the measuring edges of this device are preferably in the metric system. The principal linear measurements are expected to be taken on the edge 2. At this edge the measurements begin from the point 21, which is the vertex or meeting-point of the edges 2 and 3. On the front face of the device the scale is formed in three divisions, one being a fourth scale, another a half-scale, and the third the normal scale. The scale on the rear face of the device at this edge comprises two extra divisions, one of which is a third scale and the other a two-thirds scale—that is, on one of these extra scales the divisions are correspondingly numbered, but the distances between divisions are one-third of those on the normal scale. On the other extra scale the divisions are correspondingly numbered, but the distances are two-thirds of those on the normal scale. From this arrangement if it is desired to find the half, fourth, third, or two-thirds of any number this number may be found upon the corresponding division of the scale, and the desired or fractional part thereof will be found also on the same scale, as will be readily understood. The part of this scale which is near the point 21 constitutes a neck-scale suitable for straight measurements at the neck. The unit of measure on the edge 2 is preferably a centimeter. In using the multiplying-scales referred to on this edge evidently greater divisions or multiplications can be effected by repeating the operations successively. Thus any number can be multiplied or divided by six, eight, nine, twelve, sixteen, &c.

On the edge 3 a scale is formed, the measurements starting from the point 21. This scale at this point constitutes a neck-scale. This neck-scale is preferably formed on both the front and rear of the plate, as indicated. On the rear face and at the part remote from the point 21 a shirt-neck scale 23 is formed, the measurements beginning from the point 5.

Along the outer edge 8 on the portions 6 and 7 thereof there is formed a waist-scale 24 on the front side of the device, while a shirt-neck scale 25 is similarly placed on the rear side of the device, the measurements being taken from the point 5.

On the curve 19 a scale is formed, as shown in Fig. 2, and on the compound curve 15 graduations are also placed, as indicated. Throughout the scales the graduations are in centimeters and small divisions thereof, as found necessary.

The fact that the edges 2 and 3 are disposed at right angles to each other enables measurements to be made in two directions at right angles to each other at the same operation without necessitating the moving of the measuring-plate.

The edge 6, which extends between the points 4 and 5, is provided with arbitrarily-placed graduation-marks. Along this edge are found the sleeve-curves, also the side-form dart, bust, waist, hip, skirt, and all long curves found in garments. The curved edge 17 is used to mark an arm-scye curve for children, while the curve 14 is used to draw the corresponding curves for adults and the crotch-curves for trousers. The compound-curved edge 15 is used to draw in the front and back shoulder-lines of coats and jackets. The curve 19 is the neck-curve. All of these curves invariably require but one stroke for any size in marking.

The uses of the different parts of the measure are indicated upon the drawings. The spiral curve is used in drawing the neck-curves of the garment. Curve 13 17 18 is used to draw the arm-scye and crotch curves for children. The curve 12 14 15 is used to cut the arm-scye and crotch curves for adults, and the part 15 16 is used for drawing the shoulder-curves. The curve 5 7 6 8 9 4 is used in part or altogether to draw all of the long curves in a garment, and especially the side-form, dart, bust, hip, waist, and sleeve curves.

In using the device, after having drawn all the straight lines according to measure on the straight-line scales of the device, the guide points and lines for the curves will then be established. Thereafter it is only necessary to place the proper curve in position and to draw between the guide-points.

By the use of this device and the system of measures garments may be accurately cut, enabling the most perfect and artistic fit to be obtained.

Having thus described our invention, we claim as new and desire to secure by Letters Patent—

1. A tailor's measure consisting of a plate having two graduated edges substantially at right angles to each other, and a third edge connecting the remote extremities of said first edges, said third edge comprising a substantially straight curve and an elliptical curve connected by a parabolic curve.

2. A tailor's measure consisting of a plate having graduated straight edges disposed substantially at right angles to each other and a convex-curved marking edge connecting the remote extremities of said first edges, said plate having an opening formed therein, the edge whereof consists of a graduated spiral constituting a neck-curve.

In testimony whereof we have signed our names to this specification in the presence of two subscribing witnesses.

EDWIN ZACHARIAH LESH.
HESTER A. WOOLMAN.

Witnesses:
  WILL. B. DAVIS,
  M. E. POMEROY.